United States Patent [19]

Robichaud

[11] 4,319,651

[45] Mar. 16, 1982

[54] WEIGHING DEVICE

[76] Inventor: Kenneth Robichaud, P.O. Box 1626, Lunenburg, Mass. 01462

[21] Appl. No.: 143,759

[22] Filed: Apr. 28, 1980

[51] Int. Cl.³ .............................................. G01G 3/08
[52] U.S. Cl. .................................................... 177/229
[58] Field of Search .............................. 177/225, 229

[56] References Cited

U.S. PATENT DOCUMENTS

| 2,458,129 | 1/1949 | Amstutz | 177/229 |
| 3,091,304 | 5/1963 | Noble | 177/229 |
| 3,331,459 | 7/1967 | Abelli | |
| 3,353,615 | 11/1967 | Nekimken | 177/225 X |
| 3,967,578 | 7/1976 | Gallo | 177/225 X |

Primary Examiner—George H. Miller, Jr.
Attorney, Agent, or Firm—Norman S. Blodgett; Gerry A. Blodgett

[57] ABSTRACT

Weighing device consisting of a hollow housing in which is mounted a leaf spring and having slots which expose the spring for receiving an object and for indicating the amount of deflection of the spring due to the weight of the object.

4 Claims, 4 Drawing Figures

WEIGHING DEVICE

BACKGROUND OF THE INVENTION

It has become common practice to make use of portable tanks of liquid propane to supply fuel for use with appliances in locations where piped gas is not available and where other fuels are not convenient. An example of such a use is connecting a tank to a portable grill for use in the backyard or at a campsite. Such portable tanks usually do not carry a gage, so that it is difficult to determine the quantity of gas left in the tank. In such situations, it is possible for the user to discover that he has partially cooked a steak (for instance) for guests and suddenly to find that the tank runs out of fuel. While it would, of course, be possible to weigh the tank from time-to-time on an ordinary bathroom scale, nevertheless such scales are not always readily available or convenient. These and other difficulties experienced with the prior art devices have been obviated in a novel manner by the present invention.

It is, therefore, an outstanding object of the invention to provide a weighing device which is light in weight and which is easily carried in one's pocket.

Another object of this invention is the provision of a weighing device for monitoring the contents of a portable gas cylinder, which device is simple and inexpensive in construction.

A further object of the present invention is the provision of a weighing device which is simple and rugged, so that it is capable of a long life of useful service despite considerable abuse.

With these and other objects in view, as will be apparent to those skilled in the art, the invention resides in the combination of parts set forth in the specification and covered by the claims appended hereto.

SUMMARY OF THE INVENTION

In general, the present invention consists of a weighing device for use with a container having a supporting flange. The device consists of a housing having a vertical wall and of a leaf-spring mounted in the housing and having one end fixed and the remainder free. The first slot is formed in the wall to expose an intermediate portion of the spring and to receive the supporting flange of the container, while a second slot is formed in the wall spaced from the first slot to expose an end portion of the spring.

More specifically, the housing is generally of rectangular configuration with two spaced, parallel, vertical walls. The first slot extends downwardly from the top edges of both walls. The outer surface of the wall having the second walls of the housing at a location remote from both slots and the leaf-spring is wrapped around the shaft and is locked against rotation relative thereto.

BRIEF DESCRIPTION OF THE DRAWINGS

The character of the invention, however, may be best understood by reference to one of its structural forms, as illustrated by the accompanying drawings in which.

DESCRIPTION OF THE PREFERRED EMBODIMENT

Figure 1:
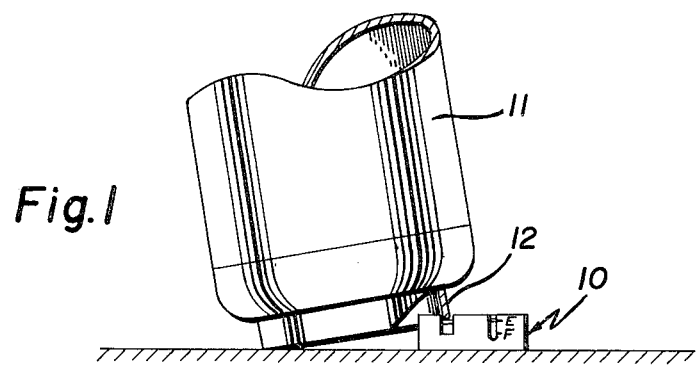
FIG. 1 is a front elevational view of the weighing device shown in use with a container.

Referring first to FIG. 1, wherein are best shown the general features of the invention, the weighing device, indicated generally by the reference numeral 10, is shown in use with a container 11 having a supporting flange 12. In the preferred embodiment, the container 11 is a portable tank of liquid propane weighing about 20 pounds.

Figure 2:
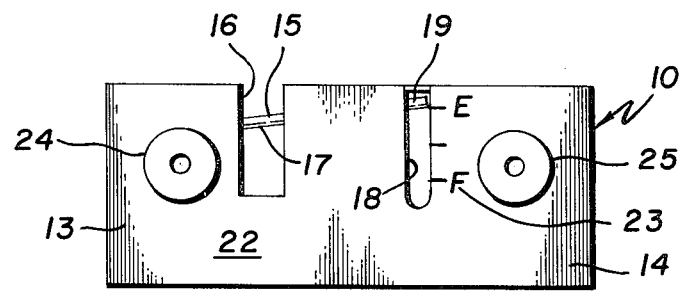
FIG. 2 is a somewhat enlarged front elevational view of the weighing device.
Figure 3:
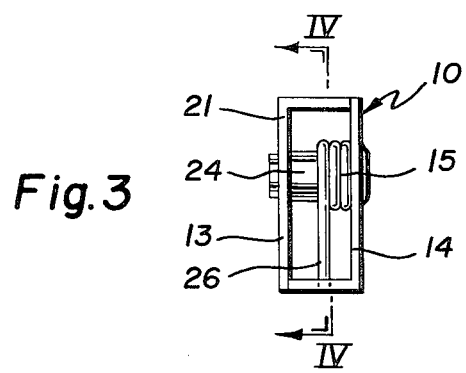
FIG. 3 is a side elevational view of the weighing device.
Figure 4:
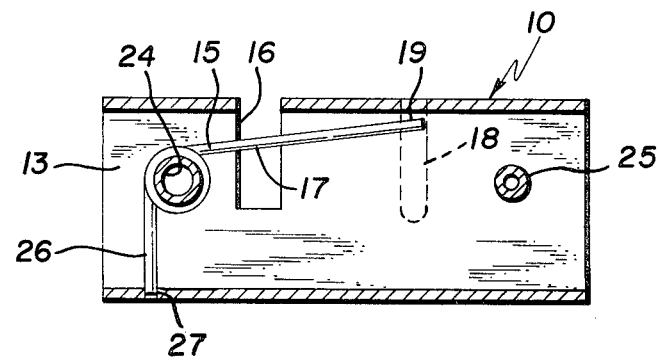
FIG. 4 is a sectional view of the device taken on the line IV—IV of FIG. 3.

As is evident in FIGS. 2, 3, and 4, the weighing device 10 consists of a housing 13 having a vertical wall 14. A leaf-spring 15 is formed of wire is mounted in the housing and has one end fixed and the remainder free. A first slot 16 is formed in the housing, thus exposing an intermediate portion 17 of the spring 15 and is adapted to receive the supporting flange 12 of the container. That is to say, it has a width substantially greater than the thickness of that flange. The second slot 18 is formed in the housing and is spaced from the first slot thus exposing an end portion 19 of the spring.

The housing 13 is of generally rectangular configuration with two spaced, parallel, vertical walls 14 and 21. The first slot 16 extends downwardly from the top edges of both walls. The second slot extends downwardly from the top edge of only the single wall 14 and is in spaced parallel relationship to the first slot 16. The outer surface 22 of the vertical wall 14 is provided with indicia 23 showing an EMPTY aor FULL condition of the container 11.

Each of the walls 14 and 21 is provided with a horizontal flange, as is best evident in FIG. 3, thus forming an open-ended box-like structure held together by rivets 24 and 25. The rivet 24 acts as a shaft extending between the walls 14 and 21; it is adjacent one end of the housing and is, therefore, remote from both slots 16 and 18. The leaf-spring 15 is wrapped around the rivet 24 and has another free end 26 that extends vertically and is locked in an aperture 27 (see FIG. 4) formed in the bottom wall of the housing. The first slot 16 is relatively wide and extends through both walls 14 and 21, while the second slot 18 is relatively narrow and extends through only one of the walls.

The manner of use of the invention and its many advantages will now be readily understood in view of the above description. When it is necessary from time-to-time to ascertain the condition of the container 11, it is only necessary to place it on a rigid horizontal surface, so that it is supported by its supporting flange 12. The weighing device 10 is placed on that same surface with its wall 14 extending vertically. The container is rotated about one side of its supporting flange 12 and the other side is lowered into the slot 16. The container is released so that the flange rests on the intermediate portion 17 of the spring 15. This causes the spring to deflect downwardly and the end portion 19 sweeps past the indicia 23 and locates itself somewhere between the EMPTY portion and the FULL portion. Naturally, the heavier the contents of the container, the further down the spring 15 is deflected.

It is thus possible to obtain simply a general idea of the status of the container, particularly as to whether it contains a large amount of liquid propane or whether it is close to empty. Because the weighing device is small and lightweight, it can be carried in the pocket or kept conveniently at the location where the container is most likely to be used, such as on a patio for use with a gas grill. Although the weighing device shown in the drawings is intended for a 20-pound portable bottle of LP gas, additional indicia may be added for use with 10-pound containers. Furthermore, since the device is inexpensive to manufacture and sell, if one becomes lost or mislaid it is relatively easy to replace it. In this way, one can avoid the distressing and embarrassing occurrence of running out of gas at an inopportune time, particularly when such an occurrence happens in a remote location where it is difficult (if not impossible) to refill the container.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Weighing device for use with a container having a supporting flange, comprising:
   (a) a housing of generally rectangular configuration with two spaced, parallel, vertical walls,
   (b) a leaf spring mounted in the housing and having one end fixed and the remainder free,
   (c) a first slot formed in the housing exposing an intermediate portion of the spring and adapted to receive the supporting flange of the container,
   (d) a second slot formed in the housing spaced from the first slot exposing an end portion of the spring, the first slot extending downwardly from the top edges of both walls, the second slot extending downwardly from the top edge of one of the vertical walls in spaced parallel relationship to the first slot,
   (e) indicia being provided on the outer surface of the wall having the second slot, the indicia showing an EMPTY and FULL condition of the container, and
   (f) a shaft extending between the said walls of the housing at a location remote from both slots, the leaf spring being wrapped around the shaft and having another free end that extends vertically and is locked in an aperture in the housing, the said end portion of the spring exposed in the second slot lying adjacent the said indicia to show a condition at or between FULL and EMPTY.

2. Weighing device as recited in claim 1, wherein the first slot is relatively wide and extends through both walls, while the second slot is relatively narrow and extends through only one of the walls.

3. Weighing device for use with a container having a supporting flange, comprising:
   (a) a housing of generally rectangular configuration with two spaced, parallel, vertical walls,
   (b) a leaf spring mounted in the housing and having one end fixed and the remainder free,
   (c) a first slot formed in the housing exposing an intermediate portion of the spring and adapted to receive the supporting flange of the container,
   (d) a second slot formed in the housing spaced from the first slot exposing an end portion of the spring, the first slot extending downwardly from the top edges of both walls, the second slot extending downwardly from the top edge of one of the vertical walls in spaced parallel relationship to the first slot,
   (e) indicia being provided on the outer surface of the wall having the second slot, the indicia showing an EMPTY and FULL condition of the container, and
   (f) a shaft extending between the said walls of the housing at a location remote from both slots, the leaf spring being wrapped around the shaft, the said end portion of the spring exposed in the second slot lying adjacent the said indicia to show a condition at or between FULL and EMPTY.

4. Weighing device as recited in claim 3, wherein the first slot is relatively wide and extends through both walls, while the second slot is relatively narrow and extends through only one of the walls.

* * * * *